(12) United States Patent
Hagedorn Maillard et al.

(10) Patent No.: US 10,030,590 B2
(45) Date of Patent: Jul. 24, 2018

(54) METHOD AND APPARATUS FOR REPROGRAMMING A VEHICLE COMPONENT

(71) Applicant: Continental Automotive Systems, Inc., Auburn Hills, MI (US)

(72) Inventors: Jurgen Christian Hagedorn Maillard, Guadalajara (MX); Irving Morales Rodriguez, Guadalajara (MX); Luis Roberto Togo Peraza, Zapopan (MX); Jorge Benitez Sosa, Zapopan (MX); Alberto Navarro Hurtado, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 426 days.

(21) Appl. No.: 14/220,585

(22) Filed: Mar. 20, 2014

(65) Prior Publication Data

US 2015/0269401 A1 Sep. 24, 2015

(51) Int. Cl.
  *G06K 7/10* (2006.01)
  *F02D 29/02* (2006.01)
  *G05B 19/00* (2006.01)
  *G05B 23/00* (2006.01)
  *G06F 7/00* (2006.01)
  *B60R 25/20* (2013.01)

(52) U.S. Cl.
  CPC .............. *F02D 29/02* (2013.01); *B60R 25/20* (2013.01)

(58) Field of Classification Search
  CPC .......... G06K 7/10; F02D 29/02; G05B 19/00; G05B 29/00; B60D 1/28; B60Q 1/00
  USPC ........ 340/5.61, 5.72, 5.1, 5.2; 701/1, 49, 35, 701/29, 33
  See application file for complete search history.

(56) References Cited

U.S. PATENT DOCUMENTS

| | | | | |
|---|---|---|---|---|
| 5,864,297 A * | 1/1999 | Sollestre | ............ | G07C 9/00817 340/426.36 |
| 6,452,483 B2 * | 9/2002 | Chen | .................... | B60R 25/104 307/10.2 |
| 6,501,369 B1 * | 12/2002 | Treharne | ................. | B60R 25/24 307/10.5 |
| 6,700,479 B2 * | 3/2004 | Birchfield | ............. | B60R 25/104 340/425.5 |
| 7,248,150 B2 * | 7/2007 | Mackjust | .............. | B60R 25/104 340/426.13 |
| 7,757,803 B2 * | 7/2010 | Fiske | ................... | B60W 30/146 180/271 |
| 7,941,846 B2 * | 5/2011 | Bejean | ................... | G08C 19/28 340/5.23 |
| 8,466,774 B2 * | 6/2013 | Lopez | ..................... | B60R 25/24 340/5.61 |
| 2005/0017842 A1 * | 1/2005 | Dematteo | .......... | G07C 9/00309 340/5.72 |
| 2005/0099265 A1 * | 5/2005 | Dix | ......................... | G06Q 10/02 340/5.72 |
| 2005/0248436 A1 * | 11/2005 | Hohmann | ............... | B60R 25/24 340/5.72 |

(Continued)

*Primary Examiner* — Nam V Nguyen

(57) ABSTRACT

A method for reprogramming an automotive device writes a programming sequence to a transponder read/write memory, interfaces the transponder with at least one vehicle system while the at least one vehicle system is installed in a vehicle, and transfers the programming sequence to the at least one vehicle system.

2 Claims, 2 Drawing Sheets

(56) References Cited

U.S. PATENT DOCUMENTS

| | | | |
|---|---|---|---|
| 2008/0150685 A1* | 6/2008 | Desai | B60R 25/2081 340/5.61 |
| 2009/0160607 A1* | 6/2009 | Edwards | B60R 25/24 340/5.61 |
| 2011/0291797 A1* | 12/2011 | Tessier | B60R 25/04 340/5.61 |

* cited by examiner ably coupled to the vehicle engine controller, at least one of the electronic component and the vehicle engine controller including a wireless communication signal receiver, an update recognition module, and a tangible memory storing instructions for causing at least one of the vehicle engine controller and the electronic component to perform the steps of interfacing at least one of the vehicle engine controller and the electronic component with a transponder while the at least one electronic component is installed in a vehicle, transferring a programming sequence to at electronic component from the transponder.

These and other features of the present invention can be best understood from the following specification and drawings, the following of which is a brief description.

METHOD AND APPARATUS FOR REPROGRAMMING A VEHICLE COMPONENT

TECHNICAL FIELD

The present disclosure relates generally to vehicle system components that include a software program, and more specifically to a system and apparatus for updating or modifying the software program in the component.

BACKGROUND

Modern vehicles include computerized controllers and electronic components with memories storing software that either controls, or assists in controlling, the operations of the vehicle. By way of example, one such part is an immobilizer. An immobilizer is an electronic security device fitted to an automobile that prevents the engine from running unless the correct key (or other token) is present in the vehicle. The immobilizer is typically interconnected with the vehicle controller and is tied to a specific key code.

It can be desirable to include functionality enabling a user to update parameters of the component software stored on the electronic component, or replace the software with a newer version entirely. Existing systems to update the software require that the component is connected to a computer. The connected computer then provides the component with the updated information. This connection is facilitated by either removing the component from the vehicle entirely or disconnecting the component from the other vehicle systems while the component remains in the vehicle in a partially installed state. Once removed or disconnected, the computer is plugged into the component via a physical connection. The component provides access to the software stored in the memory of the component and the computer is able to make alterations to the software as needed.

As a result of the required direct connection, updating a component such as an immobilizer or any other electronic component, requires a significant expenditure of labor and time. In multiple vehicles, such as in a fleet, the extensive time and labor involved is exacerbated due to the requirement that the electronic component be physically removed or disconnected in each vehicle.

SUMMARY OF THE INVENTION

Disclosed is a method for reprogramming an automotive device including writing a programming sequence to a transponder read/write memory, interfacing the transponder with at least one vehicle system while the at least one vehicle system is installed in a vehicle, and transferring the programming sequence to the at least one vehicle system.

Also disclosed is a vehicle control system including a vehicle engine controller, at least one electronic component communicatively coupled to the vehicle engine controller, at

DETAILED DESCRIPTION OF AN EMBODIMENT

Figure 1:
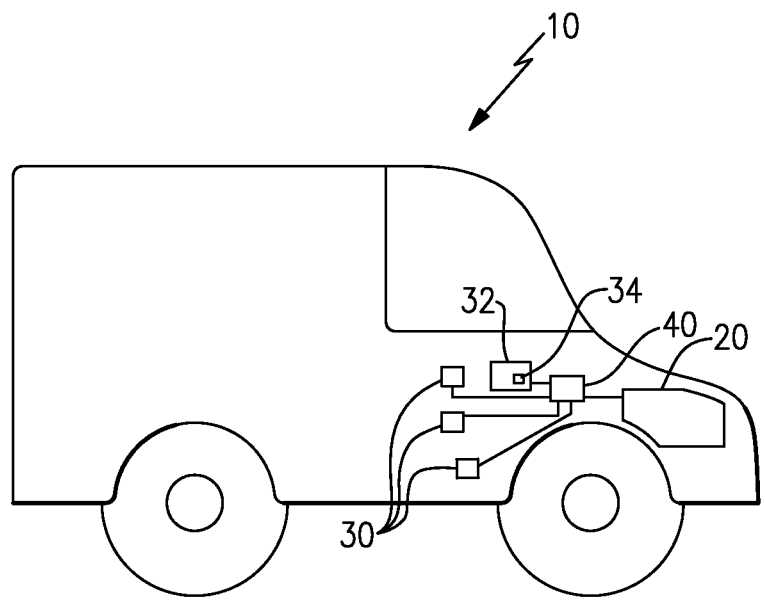
FIG. 1 schematically illustrates a vehicle including an immobilizer.

FIG. 1 illustrates a vehicle 10 including an engine 20 for providing a driving force to the vehicle 10. The engine 20 can be an internal combustion engine, an electric engine, a hybrid engine, or any other suitable engine. A typical vehicle 10 includes a controller 40 that is operable to control the engine 20, as well as multiple other vehicle components 30, 32. At least a portion of the other vehicle components 30, 32 include internal software that interfaces with the controller 40, and directly controls the operations of the component 30, 32. One such example component is an immobilizer 32. The immobilizer 32 includes a radio frequency (RF) receiver that prohibits a controller 40, or any other component, from starting the engine 20 unless a matching key is inserted into an ignition slot. Alternatively, the immobilizer 32 can be programmed to interact with a matching token or fob for keyless vehicles.

Similarly, the controller 40 includes internal software that interfaces the controller 40 with the attached components 30, 32. In alternate examples, multiple controllers 40 can be used, and additional electronic components 30 can be connected to the various controllers 40, with only minor alterations to the described system.

The immobilizer 32 includes a read/write memory component that stores the operating software. Other connected electronic components 30 including operating software can also include a read/write memory storing the software. The operating software defines the operations of, and controls, the immobilizer functions. The operating software further partially controls interfacing between the controller 40 and the immobilizer 32. The immobilizer software stores a parameter corresponding to an identification number for a key corresponding to the particular vehicle, as well as other parameters.

In one example, when a key including a transponder is inserted into the ignition of the vehicle 10, the transponder is powered by the vehicle 10 and transmits an RF signal including the key identification number. When the key identification number and the parameter number stored in the immobilizer 32 match, the immobilizer 32 allows the controller 40 to start the ignition, and the engine 20 is started.

In existing vehicles, in order to update the parameters of, or otherwise re-program the components 30, 32, the component 30, 32 is disconnected from the controller 40 and connected to a wired communication interface of a personal computer. This disconnected state is referred to as the component 30, 32 being partially installed. In some cases, the component 30, 32 must be removed from the vehicle 10 entirely (uninstalled) in order to facilitate the re-programming.

In the example of FIG. 1, the immobilizer 32 includes a wireless receiver/transmitter that is operable to receive communications from, and interface with, a transponder containing a programming sequence for updating the immobilizer software. In alternate examples, the wireless receiver/transmitter can be included on the controller 40 and the programming sequence can be transmitted through the controller 40 to the immobilizer 32.

In order to modify the parameters stored in the immobilizer 32, update the software running the immobilizer 32, or otherwise alter the stored software in the immobilizer 32, the immobilizer 32 also includes an update recognition module 34. In one example, the update recognition module 34 can be either a hardware module capable of recognizing a unique update signal from a transponder. In an alternate example, the update recognition module 34 is a software module capable of distinguishing a unique update signal from the transponder.

The update recognition module 34 allows the immobilizer 32 to recognize when a transponder contains a programming sequence for updating the immobilizer software. By way of example, the transponder can broadcast a coded "programming sequence present" signal to the vehicle 10. When the update recognition module 34 detects the coded signal, the update recognition module 34 informs the immobilizer 32 that the transponder includes an update sequence for the immobilizer 32, and begins interfacing the immobilizer 32 with the transponder.

Figure 2:
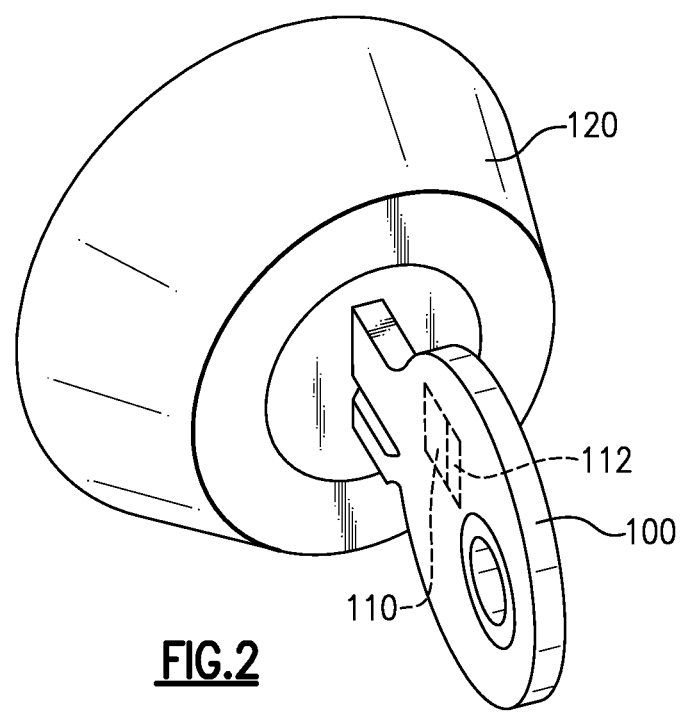
FIG. 2 schematically illustrates a vehicle key interfacing an ignition.

With continued reference to FIG. 1, and with like numerals indicating like elements, FIG. 2 illustrates a transponder arrangement where a transponder 110 is included in a key 100. The transponder 110 includes a memory 112 of sufficient size to store a programming sequence for updating a vehicle component 30, such as an immobilizer 32, described above. When the key 100 is inserted into an ignition 120, the ignition 120 broadcasts an interrogation signal that is received by the transponder 110. In response, the transponder 110 broadcasts an identification signal to the vehicle including a key identification number. In the illustrated example, the broadcast signal also includes a programming sequence present signal in addition to the key identification number. While illustrated herein as a key 100 in an ignition 120, it will be understood by one of skill in the art that the key 100 may be replaced with any token, such as a fob, and still fall within the above described disclosure.

When the transponder signal is received by the immobilizer 32, the immobilizer 32 checks the key identification signal against a reference number, and if the numbers match, the immobilizer 32 allows the controller 40 to operate the engine 20. In the case that an update sequence present signal is also present on the transponder signal, the update recognition module detects the programming sequence present signal and the immobilizer 32 begins interfacing with the transponder 110 in a manner that allows the programming sequence to be transmitted from the transponder 110 to the immobilizer 32.

In some examples, the programming sequence is a simple adjustment to one or more parameters of the immobilizer 32. In other examples, where the transponder memory 112 has sufficient size, the programming sequence can be an install file for updating immobilizer firmware, or even a complete replacement file for the immobilizer software.

In some example systems, the update recognition module can be tied to a specific key identification number, and only allow the update when the key matches the identification number. In alternate examples, the update recognition module can be fully independent of the key identification number, and a single key can be used to update a fleet of vehicles.

In one example, the immobilizer 32 or the controller 40 further includes an output component capable of outputting to a user visible screen, such as a console screen. In this example, the immobilizer 32 outputs an "update in progress" message to the user visible screen informing the user that an update is in progress. When the programming sequence is complete, the update in progress message is either removed or replaced with an "update complete" message to inform the user that the update is complete. The messages can be in the form of text messages displayed on the screen, or graphical icons conveying the information.

In yet a further example, the immobilizer 32 or the controller 40 can output the update in progress message to a light, or other indicator, that is visible to the user. In this alternative, the light can transition to a first color indicative of the programming sequence being in progress and a second color indicative of the programming sequence being completed. The light can be included anywhere visible to the user.

Figure 3:
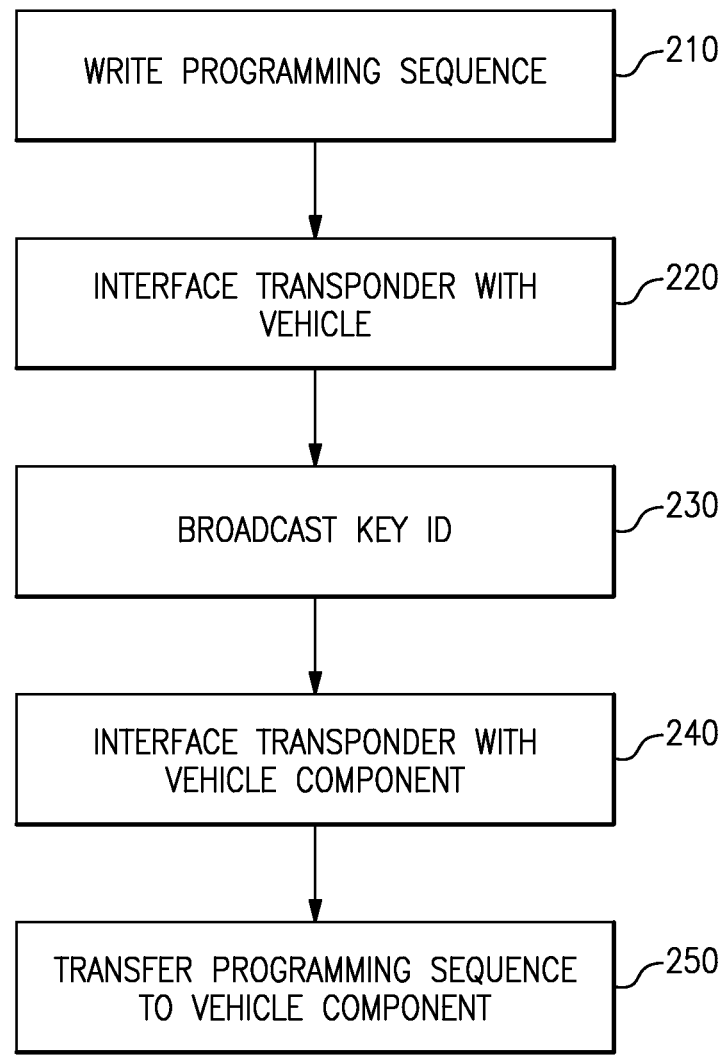
FIG. 3 illustrates a flowchart describing a system upgrade process for the immobilizer of FIG. 1.

With continued reference to FIGS. 1 and 2, FIG. 3 illustrates a flowchart describing a system upgrade process for the immobilizer of FIG. 1. Initially, the programming sequence containing the update program is written to a read/write memory 112 of a transponder 110 in a "write programming sequence" step 210. Once the programming sequence has been written to a transponder read/write memory, the transponder is interfaced with the vehicle in an "interface transponder with vehicle" step 220. In some examples, interfacing the transponder with the vehicle includes inserting a key 100 into an ignition 120. By inserting the key 100 into the ignition 120, the transponder 110 contained within the key 100 is powered form the vehicles power. Alternative transponders can be interfaced with other systems, and are not limited to a key/ignition arrangement.

Once the key 100 is interfaced with the ignition system, the transponder begins broadcasting the key identification number to the vehicle 100 in a "broadcast key ID" step 230. Included within the key identification number broadcast is a notification that the transponder 110 includes a programming sequence. When the immobilizer 32 receives the notification that the transponder 110 includes a programming sequence at the update recognition module 34, the immobilizer 32 begins interfacing with the transponder 110 in order to facilitate transfer of the programming sequence from the transponder 110 to the immobilizer 32 in an "interface transponder with vehicle component" step 240. In examples where the programming sequence and the key identification are independent of each other, a single key can be utilized to update a fleet of vehicles, without requiring a matching key ID for each vehicle.

Once the transponder 110 and the immobilizer 32 are interfaced, the transponder begins transferring the programming sequence to the immobilizer 32 in a "transfer programming sequence to vehicle component" step 250. Once the immobilizer 32 has received some or all of the programming sequence, the immobilizer 32 begins running the sequence and updates the immobilizer software.

In some example systems, the controller 40 or the immobilizer 32 can include a notification feature that notifies a user installing the update that the transfer is progress. When the notification feature is included, a display, such as a console screen in the vehicle, displays an update in progress notification during steps 240 and 250. Once the programming sequence has been fully transferred to the immobilizer 32, the notification feature either removes the update in progress notification or replaces the update in progress notification with an update completed notification. The update in progress notification and the update complete notifications can be either textual in nature, graphical in nature or a combination of both.

In some alternate examples, the update in progress notification can be a color coded lighting system with a first color indicating that the update is in progress and a second color indicating that the update is completed.

In alternate examples to the above described method, the programming sequence is received at the controller 40. In these examples, the controller 40 operates as an interfacing agent between the immobilizer 32, or other vehicle component 30, and the transponder 110. The controller 40 can either act as a "dumb" interface or merely pass data, or the controller 40 can act as a smart interface and receive the programming sequence, and operate the programming sequence thereby reprogramming the connected vehicle component 30. In yet further examples, the controller 40 can, itself, be reprogrammed via the programming sequence, with the controller 40 taking the place of the vehicle component 30 in the above described method.

While the above system is described in parts with specific regards to a key transponder updating a program within an immobilizer for a vehicle, it will be understood by one of skill in the art that the process can be utilized with any token having a transponder and any suitably equipped vehicle component.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for reprogramming a motor vehicle immobilizer, the method comprising:
   operating a wireless fob for a motor vehicle, which has a transponder and read/write memory to thereby cause the wireless fob to transmit from the transponder: a first key identification number that uniquely corresponds to the motor vehicle, and a programming sequence present signal;
   receiving both the first key identification number and the programming sequence present signal at the immobilizer, the programming sequence present signal indicating to the immobilizer that the transponder in the wireless fob has a key identification number update sequence for the immobilizer, the key identification number update sequence causing the immobilizer to recognized a second and different key identification number to thereafter be used by the wireless fob;
   receiving the key identification number update sequence at the immobilizer if the first key identification number received with the programming sequence present signal matches a key identification number stored in the immobilizer; and
   after the key identification number update sequence is successfully received by the immobilizer, enabling the motor vehicle to operate on a reception of the second key identification number from the wireless fob by the immobilizer.

2. A method for reprogramming a motor vehicle's immobilizer, the method comprising:
   operating a wireless fob having a transponder and read/write memory to cause the wireless fob to transmit from the transponder: a first key identification number that corresponds to a plurality of different motor vehicles, and a programming sequence present signal the first key identification number that corresponds to the plurality of different motor vehicles and the programming sequence present signal being independent of each other;
   receiving the first key identification number and the programming sequence present signal at the immobilizer, the programming sequence present signal indicating to the immobilizer that the transponder in the wireless key fob has a key identification number update sequence for the immobilizer, the key identification number update sequence causing the immobilizer to recognized a second and different key identification number that will thereafter uniquely correspond to the motor vehicle;
   receiving the key identification number update sequence at the immobilizer if the first key identification number received with the programming sequence present signal matches a previously stored key identification number stored in the immobilizer; and
   after the key identification number update sequence is successfully received by the immobilizer, enabling the motor vehicle to operate on a reception of the second key identification number from the wireless key fob by the immobilizer.

* * * * *